United States Patent
Deng et al.

(10) Patent No.: US 8,208,043 B2
(45) Date of Patent: Jun. 26, 2012

(54) LENS CLEANING WARNING SYSTEM AND METHOD

(75) Inventors: Yining Deng, Fremont, CA (US); David Pope, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 1028 days.

(21) Appl. No.: 12/118,022

(22) Filed: May 9, 2008

(65) Prior Publication Data

US 2009/0278950 A1 Nov. 12, 2009

(51) Int. Cl.
*H04N 5/217* (2011.01)
*H04N 9/68* (2006.01)
*H04N 5/222* (2006.01)

(52) U.S. Cl. .............. 348/241; 348/234; 348/333.04

(58) Field of Classification Search .............. 348/207.99, 348/234, 235, 341, 333.01, 333.02, 333.04
See application file for complete search history.

(56) References Cited

U.S. PATENT DOCUMENTS

| | | | |
|---|---|---|---|
| 5,343,264 A | | 8/1994 | Itoh et al. |
| 5,675,149 A * | | 10/1997 | Wood et al. ............... 250/332 |
| 5,748,299 A | | 5/1998 | Esmaeili |
| 6,791,608 B1 * | | 9/2004 | Miyazawa ............... 348/246 |
| 6,792,161 B1 * | | 9/2004 | Imaizumi et al. ............ 382/275 |
| 6,940,550 B2 | | 9/2005 | Kitawaki et al. |
| 6,940,554 B2 * | | 9/2005 | Robins et al. ............. 348/335 |
| 7,215,372 B2 | | 5/2007 | Ito et al. |
| 7,245,320 B2 | | 7/2007 | Kaplinsky et al. |
| 7,295,233 B2 | | 11/2007 | Steinberg et al. |
| 7,619,668 B2 * | | 11/2009 | Saka et al. ............... 348/251 |
| 2008/0046150 A1 | | 2/2008 | Breed |

FOREIGN PATENT DOCUMENTS

EP 1 452 905 B1 9/2004

OTHER PUBLICATIONS

EarthBound Light, D300 and D3 Sensor Cleaning Warning, pp. 1-4, 2007.

* cited by examiner

*Primary Examiner* — David Ometz
*Assistant Examiner* — Peter Chon

(57) ABSTRACT

Lens cleaning warning systems and methods. A system includes an image processing unit configured to analyze image data to determine whether the image data indicates lens flare and, if so, provide an indication to the user that the lens is contaminated.

16 Claims, 11 Drawing Sheets

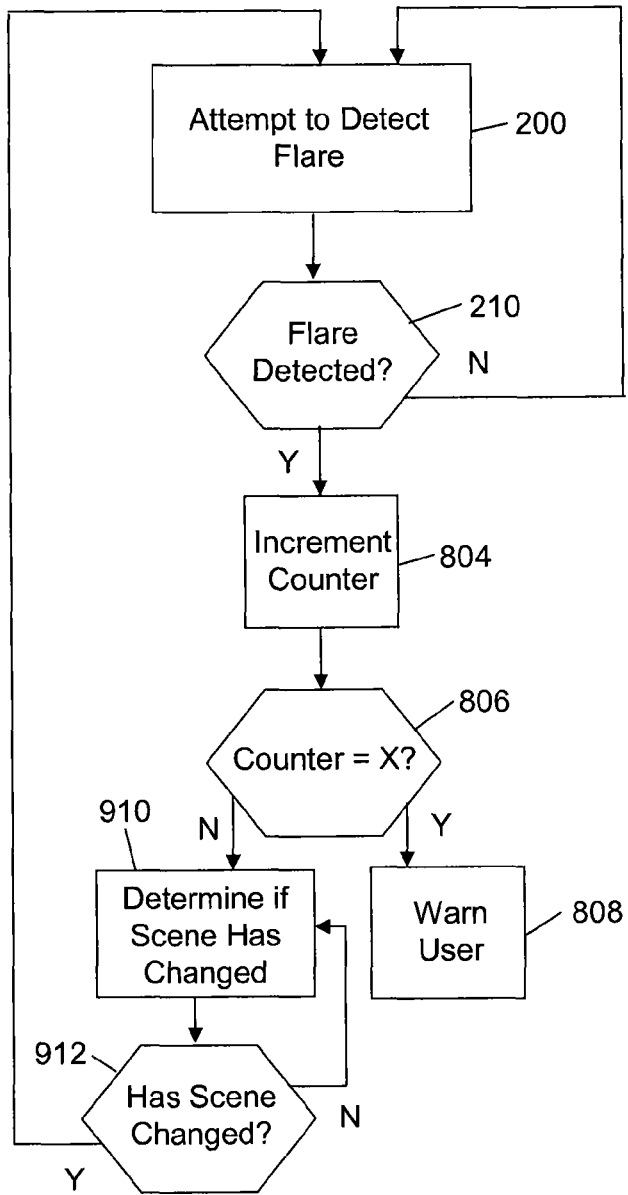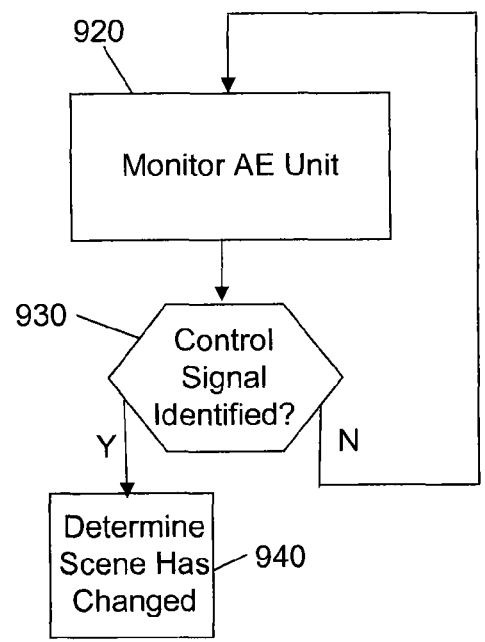
FIG. 8A
FIG. 8B

LENS CLEANING WARNING SYSTEM AND METHOD

BACKGROUND OF THE INVENTION

Lens flare is a generally undesirable feature of some images, which causes these images to appear foggy. This foggy appearance may occur when, for example, light incident on individual pixels in an image sensor is scattered before it reaches the sensor, spreading the light amongst all or many of the pixels in the image sensor. Lens flare has several known causes, among which may include oils, dirt, finger prints, lint, dust and/or other contaminants on the lens of the camera which includes the image sensor.

Lenses on conventional cellular telephone cameras do not have lens covers or, if they do, the lens covers are slid by a user's fingers to cover or uncover the lens. Due to the lack of lens cover or, alternatively, to the user sliding his or her fingers in the vicinity of the lens to cover and uncover the lens, cellular telephone camera lenses may easily become covered with contaminants (e.g., oils, finger prints, etc.). Also, when a user places the camera in his or her pocket, purse, or other container or leaves the camera out for an extended period of time, the lens may become covered with contaminants (e.g., dirt, lint, dust, etc.). While not as prevalent a problem for non-phone digital cameras, lenses on such cameras may become contaminated as well.

Because images produced by a camera appear foggy when its lens is contaminated, the user will likely notice that the camera is not producing quality images. The defects in the image produced by the imager through a contaminated lens are commonly called "lens flare." Many users, however, will not know that the unsatisfactory images are caused by contaminants on the lens. Further, even if the user does know that such unsatisfactory images may be caused by contaminants on the lens, a user looking through the view finder (a different lens) or the preview screen (which is often too small to see the image clearly) may not notice that the lens is contaminated before he or she takes the picture. Accordingly, the user may attribute the poor quality of the images to the quality of his or her camera instead of taking appropriate steps to clean the lens.

BRIEF DESCRIPTION OF THE DRAWING

Included in the drawing are the following figures:

FIG. 8A is a flow chart of steps for providing an indication that a camera lens is contaminated based at least on flare detection over at least one scene change.

FIG. 8B is a flow chart of steps for determining whether a scene change has occurred.

DETAILED DESCRIPTION OF THE INVENTION

Figure 1:
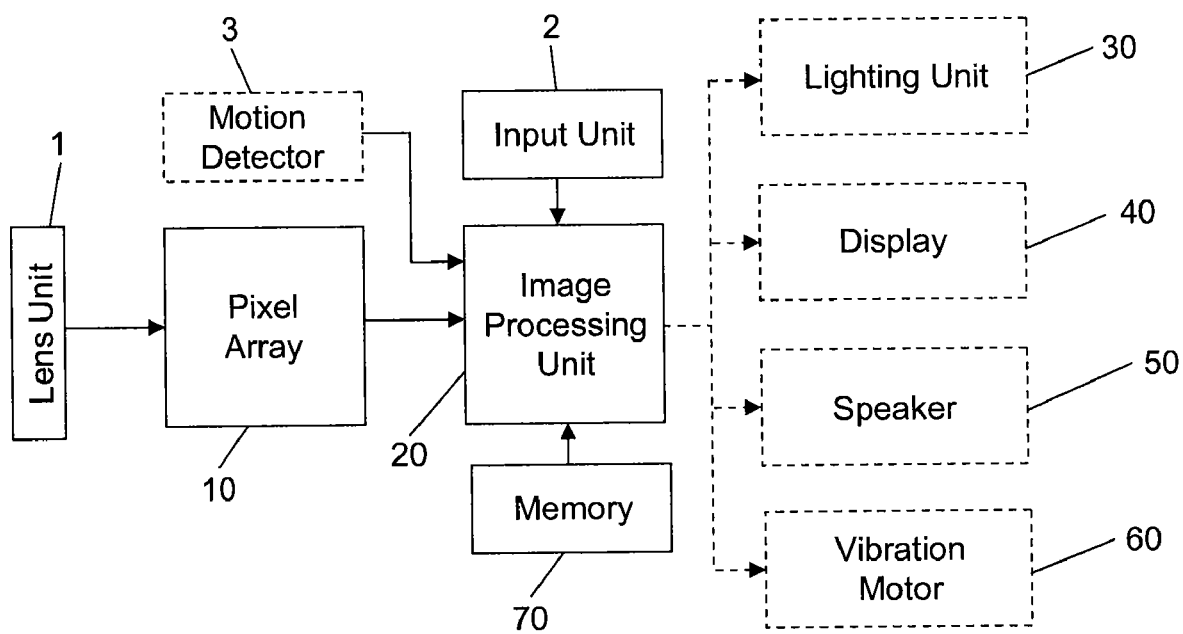
FIG. 1 is a block diagram of a lens cleaning warning system.

FIG. 1 is a block diagram of an embodiment of a system for warning that a camera lens is contaminated. As shown, the system includes a lens unit 1, an optional motion detector 3, a pixel array 10, an image processing unit 20, a memory 70, an input unit 2 for allowing a user to interact with the image processing unit 20, and one or more of a lighting unit 30, a display 40, a speaker 50 and a vibration motor 60. In operation, the lens unit 1 may focus a scene within its field of view onto pixel array 10. When the system is on and is in camera mode, the pixel array 10 continually produces signals representing the scene(s) focused onto it. The signals are read out from the array 10 using readout circuitry (not shown) and processed using the image processing unit 20. The processing unit 20 may be configured as hardware or may be configured to process software stored in memory 70.

Figure 2:
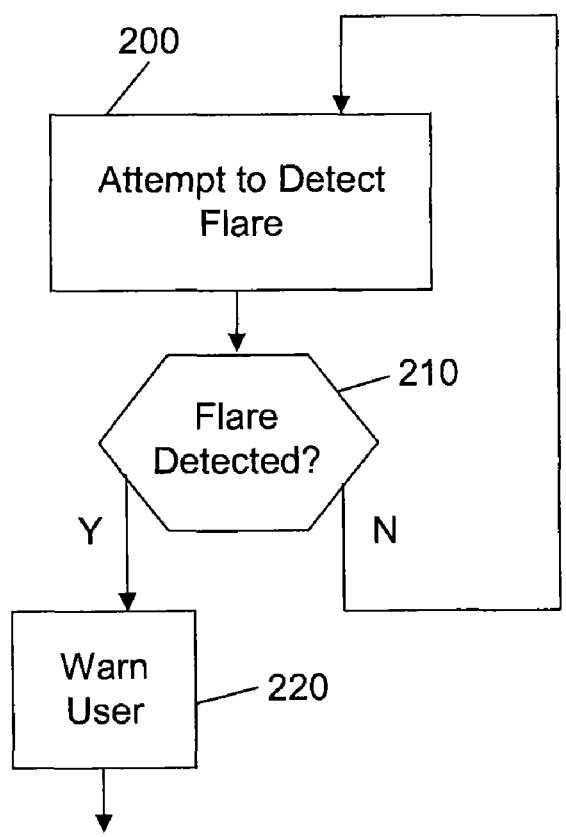
FIG. 2 is a flow chart of steps for providing an indication that a camera lens is contaminated.

FIG. 2 is a flow chart showing steps in an embodiment of image processing which may be carried out by image processing unit 20. As shown in FIG. 2, in step 200, the image processing unit 20 attempts to detect "lens flare" in each captured image. Use of the term "lens flare" herein is intended to mean lens flare caused by a contaminated lens. In step 210, whether the image processing unit 20 detected lens flare is determined. If the image processing unit 20 did not detect lens flare, processing returns to step 200 wherein the image processing unit 20 continues attempting to detect lens flare. If the image processing unit 20 did detect lens flare, processing continues at step 220 wherein the user is warned that his or her camera lens may be contaminated. To warn the user, the image processing unit 20 may output a control signal to one or more of the lighting unit 30, the display 40, the speaker 50 and/or the vibration motor 60, as shown in the block diagram of FIG. 1. Receipt of the control signal may cause one or more of these units to provide an indication to the user. By way of example, the lighting unit 30 may emit light, the display 40 may display an indicator, the speaker may emit sound and/or the vibration motor 60 may vibrate.

The image processing unit 20 may attempt to detect lens flare in one of a number of different ways. In one embodiment, the image processing unit 20 may detect flare using a pixel histogram of the image signal.

Figure 3:
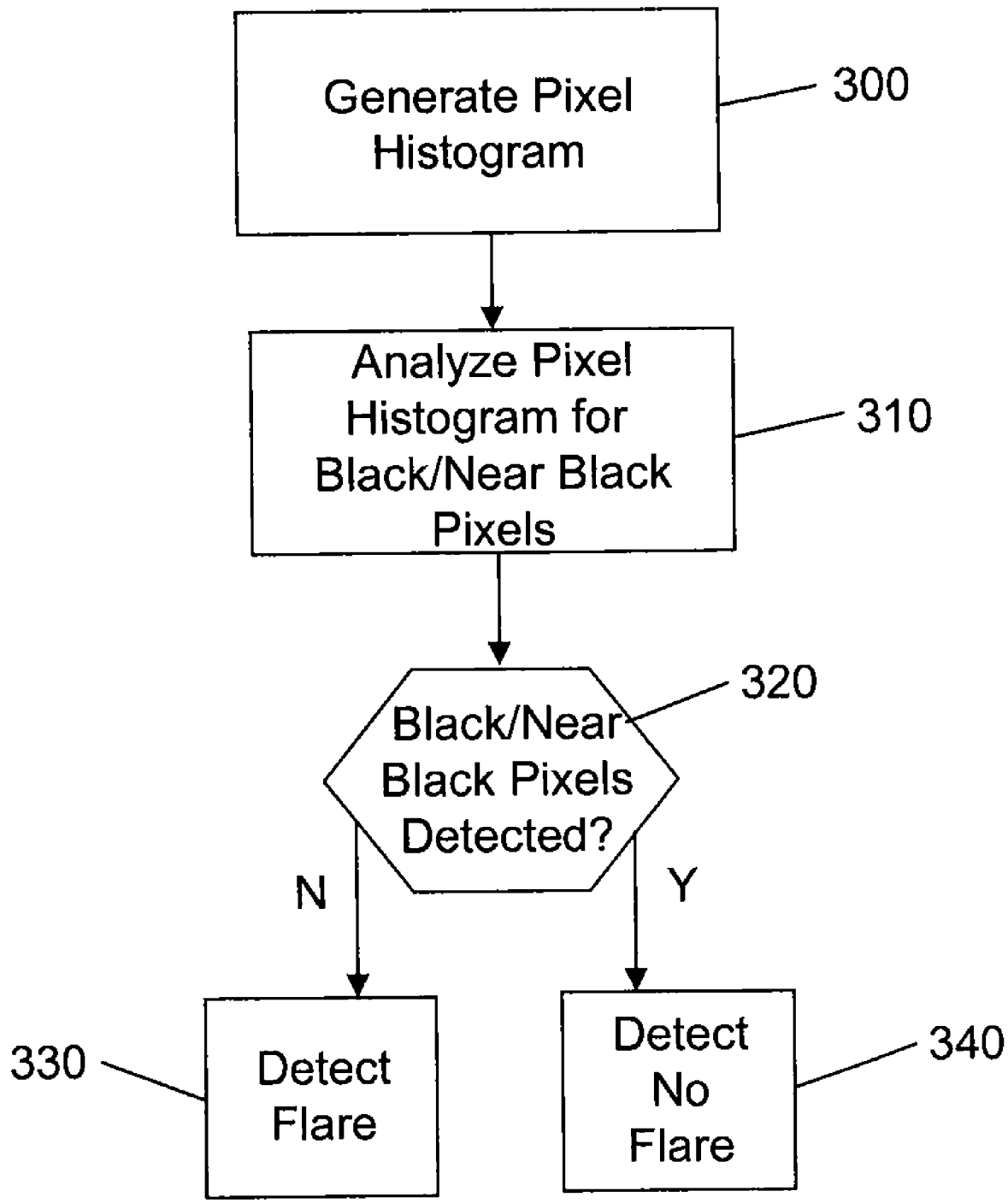
FIG. 3 is a flow chart of steps for detecting lens flare based on a pixel histogram.

FIG. 3 is a flow chart showing steps image processing unit 20 may carry out to detect flare. In step 300, a pixel histogram may be generated. In step 310, the pixel histogram may be analyzed for black or near black pixels. A lack of black or near black pixels in the image may indicate that lens flare may be present in the image. In decision block 320, image processing unit 20 may determine whether black or near black pixels were detected. If black or near black pixels were detected, processing proceeds to step 340 wherein flare may not be detected. If black or near black pixels were not detected, processing proceeds to step 330 wherein flare may be detected.

The absence of black pixels may indicate flare because lens contamination may cause light from adjacent lighter pixels to be incident on the black pixel locations, making the sensed pixel values less black.

Figure 4:
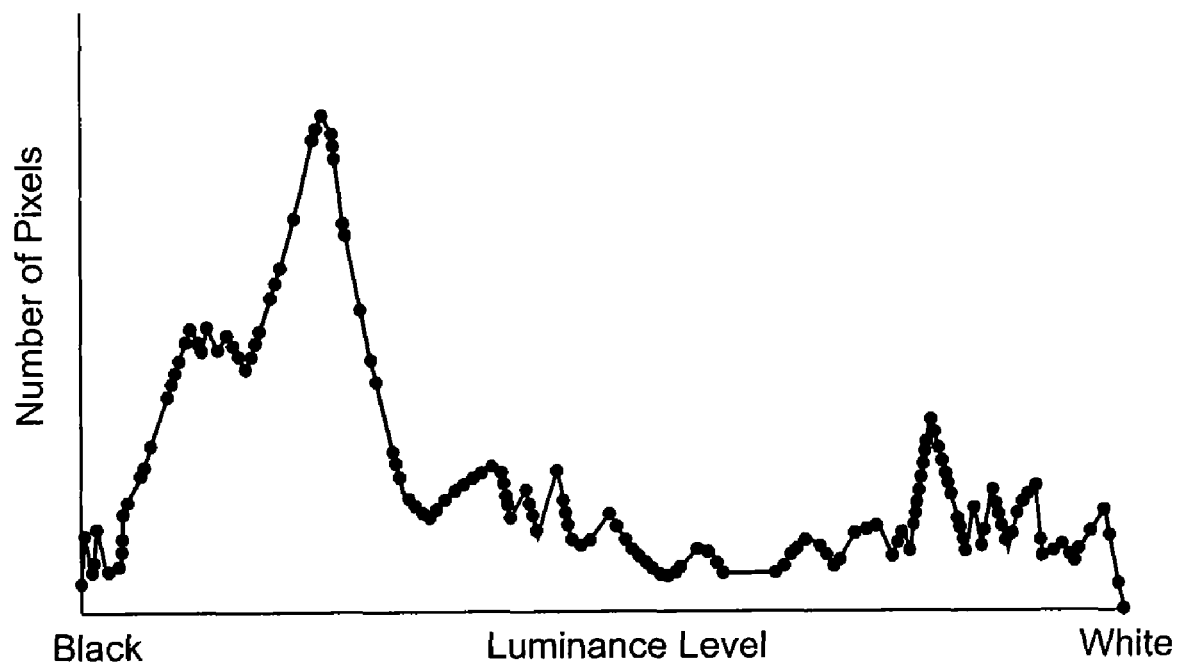
FIG. 4. is an example pixel histogram.

FIG. 4 shows an example pixel histogram. Using methods known in the art, to generate a pixel histogram, the image processing unit 20 may sort pixels based on the luminance level indicated by the signal generated by each pixel. As shown in FIG. 4, the histogram is broken into a predetermined number of different luminance level values. The lowest luminance level value in the histogram represents black light and the highest luminance level value in the histogram represents white light. By way of example, for an 8-bit image, the histogram may be broken into 256 luminance level values. In this example histogram, a luminance level value of zero represents black light and a luminance level of 255 represents white light. The vertical axis of the pixel histogram, as shown in FIG. 4, represents the number of pixels in the pixel array providing signals indicating each respective luminance level. By way of another example, for a 12-bit image, the histogram may be broken into 4096 luminance levels. In one embodiment, the image processing unit 20 may examine a raw histogram before any histogram stretching has been performed.

The example histogram shown in FIG. 4 represents a captured image that has pixels having corresponding luminance values that span the entire range between black and white. For an image exhibiting lens flare, as described above, the image tends to exhibit a lack of pixels toward the black end of the range. Taking advantage of this feature of images exhibiting lens flare, the image processing unit 20 may determine that lens flare is present in or absent from an image by inspecting the pixel histograms of captured images for a lack of black or near black pixels. In an example embodiment, the image processing unit 20 may inspect the histogram for a lack of pixels within a predetermined range (e.g., approximately the bottom 5% of the range of values represented by the histogram). It is contemplated that this range may change for an individual imager or optical system.

What is considered "black" may vary from camera to camera. During manufacture, however, a black level for the imager may be determined by aiming the camera at a black target and measuring the average response of the pixels. If a black level is determined for a given camera, it may be used to determine the luminance level, or range of luminance levels, to search for in the pixel histogram. For example, if the black level corresponds to a luminance level 2 for a given camera, the image processing unit 20 may inspect the pixel histogram for pixels having a luminance level of 2 or for pixels having luminance levels in a range including 2. Thus, while example ranges are provided herein, it should be understood that the ranges may vary from camera to camera.

It may also be desirable to inspect the pixel histogram over a wider range of luminance levels in order to, for example, distinguish between flare and, for example, a truly white image (e.g., a snow scene or a picture of a white wall). By way of example, the image processing unit 20 may inspect the pixel histogram over a range encompassing the black level of the camera and also over an adjacent range just above the range encompassing the black level of the camera. For example, for the camera having a black level corresponding to the luminance level of 2, the image processing unit 20 may inspect the pixel histogram over the range between 0 and 20. If no pixels fall in the 0 to 4 range and some pixels fall in the 5-20 range, then the image processing unit 20 may determine that flare is present in the image. The lack of pixels in the 0 to 4 range may indicate a lack of black or near black pixels in the image. Conversely, pixels in the 5-20 range may indicate that while there are no black or near black pixels in the image, there are at least some dark pixels in the image. Thus, the image is not a truly uniform image and flare is likely present in the image. Alternatively, the image processing unit 20 may inspect the pixel histogram over a plurality of non-adjacent ranges. By way of example, image processing unit 20 may inspect over a low range (e.g., 0-10) and a high range (e.g., 246-256) (e.g., for absence of pixels in the low range and presence of pixels in the high range). It may also be desirable to inspect the pixel histogram over more than 2 ranges or over the entire pixel histogram to provide greater accuracy in distinguishing between true lens flare and, for example, an image including no or few pixels having low luminance levels that does not exhibit lens flare.

In another embodiment, the image processing unit 20 attempts to detect flare by determining the sharpness of an image using edge detection techniques. Edges are locations in images wherein luminance values between neighboring pixels vary significantly. Because of this property, one or more sharp edges in the image may indicate that no flare is present.

Figure 5:
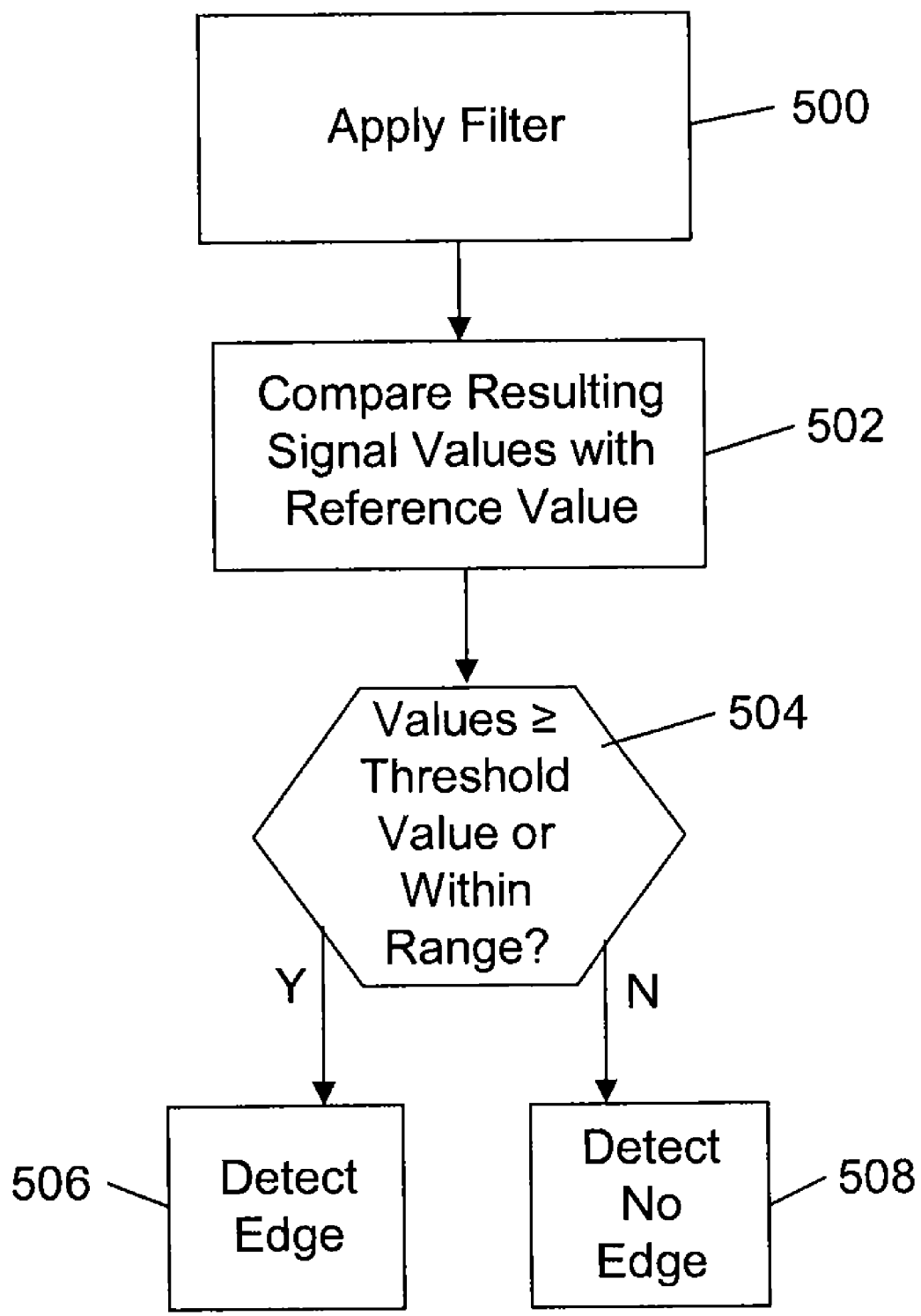
FIG. 5 is a flow chart of steps for detecting an edge.

FIG. 5 is a flow chart showing steps in an embodiment of a spatial filtering method which may be used to detect strength of edges in an image. At step 500, a filter is applied to the image signal to provide filtered image values. In step 502, the resulting filtered image values are compared with a reference value. The reference value may be any value sufficiently large to represent a noticeable difference in luminance between each pixel and its neighboring pixels and may depend, at least in part, on the coefficients chosen for the filter. In decision block 504, image processing unit 20 determines whether select filtered image values are greater than or equal to a threshold value or within a threshold range. If yes, in step 506 image processing unit 20 determines that a sufficiently strong edge has been detected. If no, in step 508 image processing unit 20 determines that a sufficiently strong edge has not been detected.

By way of example, spatial filtering may be carried out using gradient or laplacian methods. Many other methods of edge detection are known in the art. Any of these other methods may be used to carry out spatial filtering.

Using a gradient method of edge detection, the first derivative (gradient) of the image signal is determined. Thus, using a gradient method, the filter described in step 500 is a gradient filter and the resulting filtered image values described in step 502 are the gradient values. In the gradient, the maximum and minimum values typically represent regions of contrast in the image. Thus, the maximum and minimum values will generally be among the selected filtered image values. Using the gradient method, the amount of contrast which is considered sufficient to represent a lack of flare in the image may be controlled by selecting an appropriate reference value for use in step 504. By comparing the maximum and minimum gradient values to the selected reference value, a detected edge may be determined to be strong enough to indicate a lack of flare in the image.

The gradient of a 2-dimensional image may be determined using any of a number of methods known in the art. By way of example, the Sobel method may be used. Using the Sobel method, the gradient filter is a Sobel filter, which includes two convolution masks. One of the masks is used to determine an estimate of the gradient for rows in the image (Gx) and the other is used to determine an estimate of the gradient for columns in the image (Gy). Example Sobel masks Gx and Gy are shown below.

| Gx | | |
| --- | --- | --- |
| −1 | 0 | 1 |
| −2 | 0 | 2 |
| −1 | 0 | 1 |

| Gy | | |
|---|---|---|
| −1 | −2 | −1 |
| 0 | 0 | 0 |
| 1 | 2 | 1 |

To determine the gradient of the image, the center of the mask is aligned with a pixel to be processed. The Gx mask is applied to each pixel across the rows, excluding pixels in the first and last columns. The masks are applied by multiplying the pixels by the respective mask values and summing the result. Similarly, the Gy mask is applied to each pixel down the columns, excluding pixels in the first and last rows. The magnitude of the gradient is calculated as follows:

$$|G| = \sqrt{Gx^2 + Gy^2} \qquad (1)$$

It may be desirable to determine horizontal and/or vertical edges over multiple pixels to ensure that an edge is being detected and not noise or an individual defective pixel.

Using a laplacian method of edge detection, the second derivative of the image signal is determined. Thus, using a laplacian method, the filter described in step 600 is a laplacian filter. In the second derivative of the image signal, the points in the signal that fall within a range including a reference value X=0 (e.g., −1≦X≦1) represent regions of contrast in the image. Thus, X=0 will generally be the selected filtered image value and the threshold value will generally be a range, for example, as described above. As with the gradient method, using the laplacian method, the amount of contrast which is considered sufficient to represent a lack of flare in the image may be controlled by selecting an appropriate range for use in step 504.

The second derivative of a 2-dimensional image may be determined using any of a number of methods known in the art. By way of example, a 3×3 mask may be applied as a filter kernel over pixels in the image. Using a laplacian method, as opposed to a gradient method, for example, only one mask need be used for detecting edges in both the rows and columns in the image.

When using the example methods described above with respect to FIG. 5, e.g., to determine and analyze the gradient or the second derivative, the image processing unit may be hardware or may execute software stored in memory 70 as known in the art.

After edge strength detection has been carried out for all desired pixels, the next step is to determine from that information whether flare is present in the image signal. This may be done in at least two ways, the steps of which are illustrated in the flow charts shown in FIGS. 6A and 6B respectively.

Figure 6:
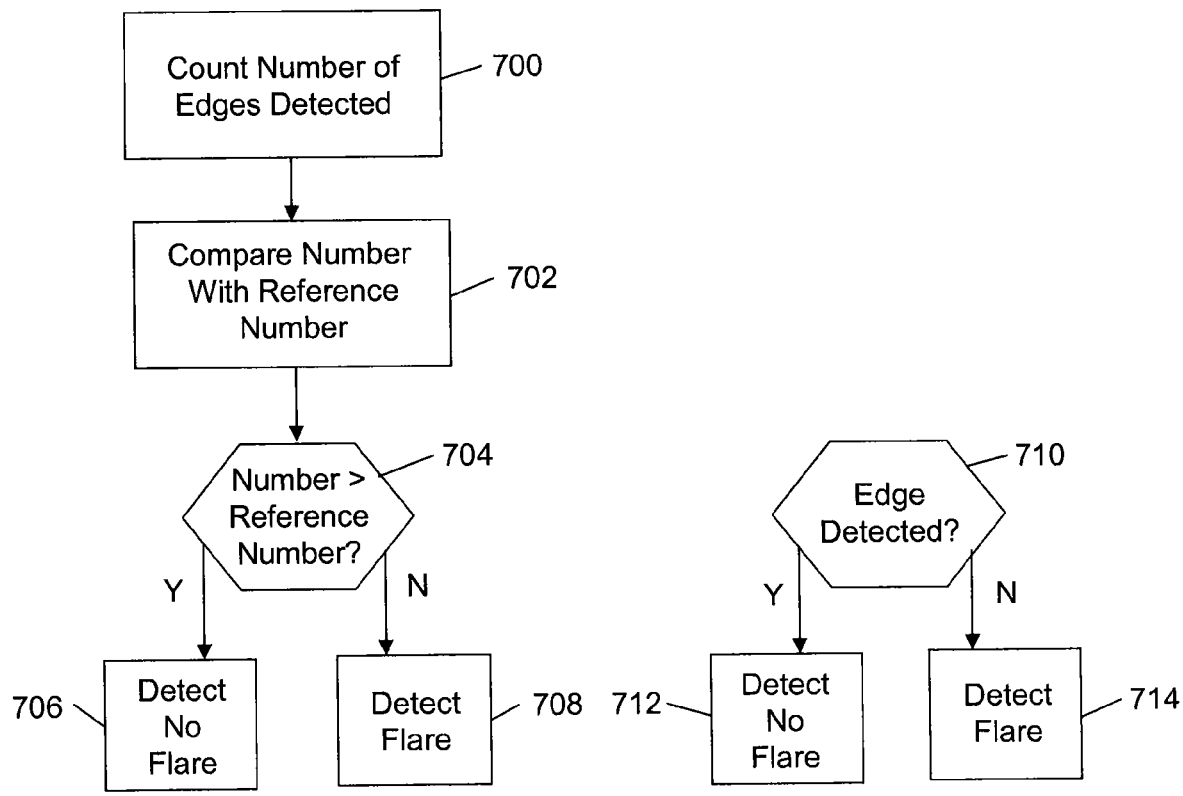
FIGS. 6A and 6B are flow charts of steps for determining whether flare is detected based on edge detection.

Using the method illustrated in FIG. 6A, in step 700, the number of detected edges having an edge strength greater than a threshold value is determined. This may be done, for example, by incrementing a counter (not shown) or storing a non-zero value into a first in first out (FIFO) buffer of length N (hereinafter referred to as "a counter") each time an edge is detected. In step 702, the number of detected strong edges is compared with a reference number. The reference number may be, for example, any number indicative of a number of detected edges representative of a low probability of flare (e.g., 1). In decision block 704, image processing unit 20 determines whether the number of detected strong edges is greater than or equal to the reference number. If yes, image processing unit 20 determines at step 706 that no flare was detected. If no, image processing unit 20 determines at step 708 that flare was detected.

Alternatively, using the method illustrated in FIG. 6B, in decision block 710, whether an edge has been detected is determined. If an edge of sufficient strength has been detected, image processing unit 20 determines at step 712 that flare was not detected. If an edge has not been detected, image processing unit 20 determines at step 714 that flare was detected. Here, if only one edge is a satisfactory indication that flare is present in the image, the counting and comparing steps shown in FIG. 6A may be left out of the process.

By way of other examples, flare may be detected by filtering the image signal in the spatial frequency domain. For example, a band pass filter may be used. Again, because flare is typically accompanied by a lack of edges in the image, a band pass filter may be used to detect spatial frequencies within a particular band in a higher spatial frequency range. To do this, the image signal may first be converted to the spatial frequency domain (e.g., using a discrete cosine transform (DCT)). The resulting signal may include only those spatial frequencies in the selected band (if they are indeed present). If the resulting signal has no energy in the selected band, the image processing unit 20 may determine the image contains flare.

By way of another example, the camera may be configured to perform JPEG compression on captured images. Here, the image processing unit 20 may be configured to analyze a JPEG compressed image signal for high spatial frequency components or spatial frequency components in a particular band. JPEG compressed images represent blocks of pixels as blocks of DCT coefficients. Some of these coefficients represent high vertical spatial frequencies, others represent high horizontal spatial frequencies, and still others represent high vertical and high horizontal spatial frequencies. The analysis may, for example, compare the coefficients representing high horizontal or vertical spatial frequencies to a threshold to develop a measure of edge strength in the image.

In one embodiment, flare may be analyzed and a warning given before a user attempts to a take a picture. The captured images analyzed for flare may be preview images, for example. In some cameras, preview images are sub-sampled. Sub-sampling without anti-aliasing filtering is not problematic when using the pixel histogram to detect flare because it is likely that if a pixel that is not sampled is black, a neighboring pixel that is sampled will also be black. Where sharpness detection is used, however, sub-sampling may be problematic because the sub-sampling may result in an erroneous edge strength measurement.

In some cameras, sub-sampling is performed only on preview images in the vertical and not the horizontal direction. For these cameras, sharpness detection may still be used if it is limited to the horizontal direction. For other cameras wherein sub-sampling is used for preview images in both directions, it may be desirable to use histogram inspection rather than sharpness detection to detect flare.

With respect to how the image processor 20 determines when to analyze images for flare, every image may be analyzed for flare or, alternatively, images may be analyzed for flare one time during each particular time interval (e.g., once per second) or after a scene change has been detected.

It may be desirable to consider whether what is detected is true flare or is some other image quality (e.g., blur, for example, caused by moving the camera, or other image properties such as an all white image). In one embodiment, distinguishing that what is detected is flare rather than, for example, other image properties, may be done by warning the user to clean his or her lens when flare has been detected in a predetermined number of images. The predetermined number may be, for example, a number that indicates a sufficient probability that true flare has been detected. Two different embodiments for doing this are shown in FIGS. 7 and 8, respectively.

Figure 7:
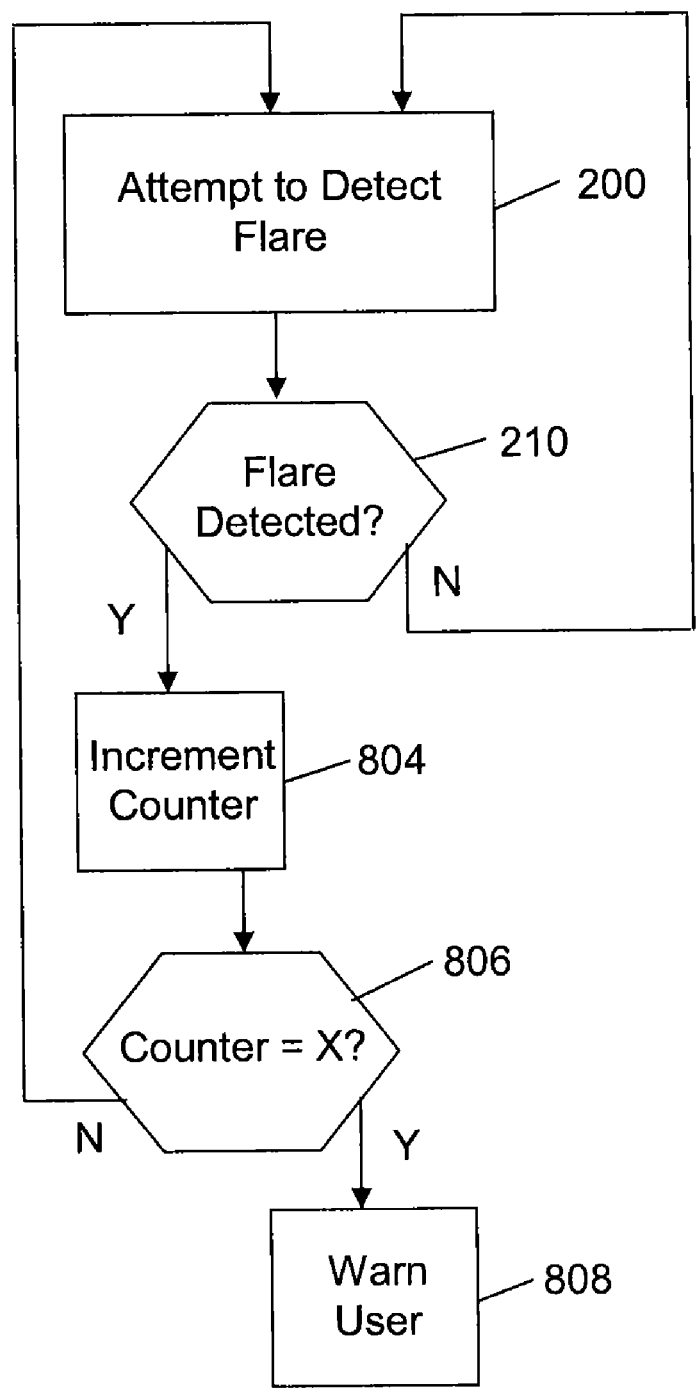
FIG. 7 is a flow chart of steps for providing an indication that the camera lens may be contaminated.

FIG. 7 is a flow chart illustrating steps in a method for warning a user when flare is detected in a predetermined number of images. In step 200, the image processing unit 20 attempts to detect flare. In decision block 210, the image processing unit 20 determines whether flare was detected. If flare was detected, processing proceeds at step 804 wherein a counter (not shown) is incremented. Then, in decision block 806, it is determined whether the counter has a value equal to a predetermined value X. If the counter value is equal to X, the user is warned at step 808. If the counter value does not equal X, processing returns to step 200 wherein the image processing unit 20 continues attempting to detect flare. If no flare was detected in decision block 210, processing returns to step 200 wherein the image processing unit 20 continues attempting to detect flare.

In the embodiment shown in FIG. 7, X may be any arbitrary number or may be any number of images which, when processed, indicate a high probability that what is detected is flare.

FIG. 8A is a flow chart illustrating steps in a method for warning a user when flare is detected in a predetermined number of consecutive images taken of different scenes. Steps 200, 210, 804, 806 and 808 are the same as for the method described with respect to FIG. 7. Here, however, if the counter value does not equal X in step 806, processing proceeds at step 910 to determine whether the scene has changed. In decision block 912, the image processing unit 20 decides whether it was determined that the scene has changed and is stable. If not, processing returns to step 910 wherein the image processing unit 20 continues determining whether the scene has changed and is stable. If yes, processing returns to step 200 wherein the image processing unit 20 continues attempting to detect flare. Thus, if flare is detected over X scene changes, the user is warned.

Using the method of FIG. 7, the probability that true flare is detected is higher than if only one image is used to detect flare. Using the method of FIG. 8A, that probability is increased. When flare is detected over a number of different scene changes, it is much more likely that the lack of black or near black pixels or sufficiently strong edges, for example, in an image is indicative of image flare rather than just being a result of the features of the captured image (e.g., an all white image).

Whether the scene has changed and is stable in step 910 may be determined in any way known in the art. By way of example, the image processing unit 20 may interact with an automatic exposure (AE) function of the camera to determine whether the scene has changed and is stable. The AE function may be included within image processing unit 20 or may be a separate unit (not shown).

On a basic level, the AE function of the camera provides for using a luminance value for an image to determine whether an amount of integration time for the pixel array should be adjusted to achieve a target luminance. In addition, the AE function may provide for oscillation control such that the integration time is not changed if, for example, a time averaged luminance for the image is within a predetermined range of values. It can be assumed, therefore, that the integration time will not be changed unless the scene has changed.

FIG. 8B is a flow chart showing example steps for using the AE unit to determine whether a scene has changed and is stable. In step 920, the image processing unit 20 monitors the AE unit (not shown) for provision of a control signal. In decision block 930, the image processing unit 20 determines whether a control signal indicating change of integration time has been identified and that this changed time has been used for a predetermined number of frames. If yes, processing continues at step 940 wherein it is determined that the scene has changed and is stable. If not, processing returns to step 920.

In addition, or alternatively, determining whether the scene has changed and is stable may be accomplished by examining block averages, or averages of areas of a scene. Block averages are a common feature of AE systems. By comparing the block averages of successive scenes, it is possible to detect when the scene is changing and when it is stable. Also, it may be desirable to examine auto-focus (AF) information instead of, or in addition to, examining the AE information. For example, in AF systems, a figure of merit, or focus score that may be generated by the AF statistics block, stabilizes when a scene is stable. The scores change rapidly when a scene is changing. Thus, it may be desirable to compare AF statistics from successive frames to determine when the scene has changed and is again stabilize. In yet another embodiment, it may be desirable to examine motion vectors, when available, to determine whether the scene has changed and is stable. In a conventional camera system with motion vector availability, for example, the motion vectors will approach zero when the scene is stabilized. Thus, it may be desirable to examine the motion vectors with respect to a predetermined threshold (e.g., a value near zero) to determine when the scene has changed and is stable.

Figure 9:
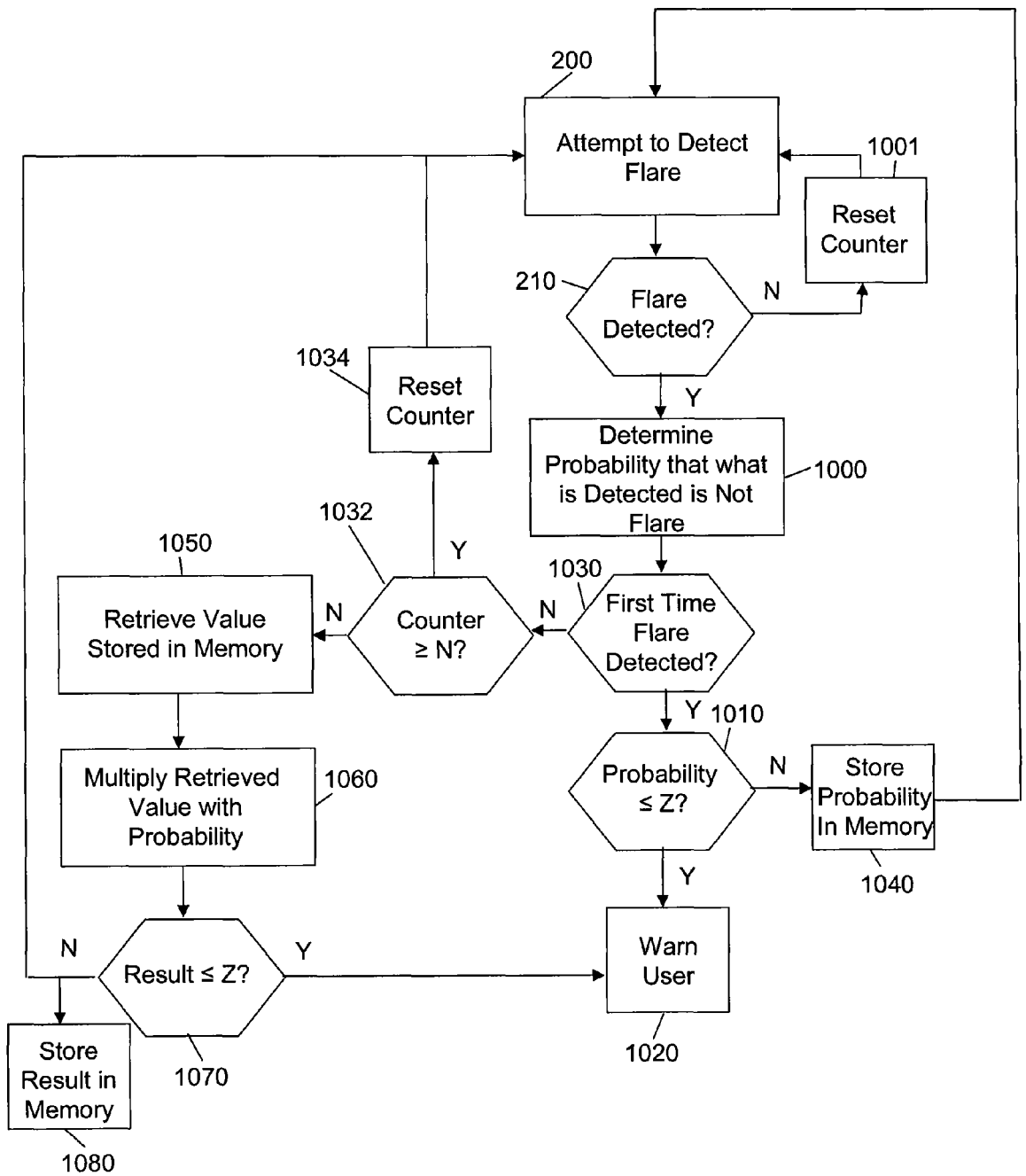
FIG. 9 is a flow chart of steps for providing an indication that a camera lens is contaminated based at least on a probability that what is detected is not flare for at least one image.

FIG. 9 is a flow chart of a method for warning the user to clean his or her lens only when a probability that what is detected is not flare reaches a predetermined threshold value Z. The predetermined threshold Z will likely be a low number (e.g., $\leq$ one percent) in order to ensure a high probability that what is detected is flare. In step 200, the image processing unit 200 attempts to detect flare. In decision block 210, whether flare was detected is determined. If not, a counter (not shown) is reset to zero and processing returns to step 200 wherein the image processing unit 200 continues attempting to detect flare. If yes, processing proceeds to step 1000 wherein the image processing unit 20 determines a probability that what is detected is not flare, for example, using a statistical measure. While this embodiment is described in terms of comparing a probability that what is detected is not flare with a lower threshold Z, it should be understood that this may also be done by comparing a probability that what is detected is flare with a higher threshold Z' (e.g., 95%). The probability of detecting flare may be calculated, for example, by subtracting the probabilities that flare was not detected from one.

Once a probability is determined in step 1000, processing proceeds to decision block 1030 wherein the image processing unit 20 determines whether it is the first time flare has been detected during the present cycle. This may be done, for example, by resetting the counter to zero each time a user is warned in step 1020, incrementing the counter each time flare is detected in step 1000 and checking the value of the counter in step 1030. If the value of the counter is zero, then it is the first time flare has been detected. If it is any other value, then it is not the first time flare has been detected. Because the counter is also reset when flare is not detected in step 210, this ensures that a cumulative probability stored in memory is only for consecutive images or scenes.

If flare has been detected for the first time in the cycle, it is determined whether the counter value is greater than or equal to a predetermined threshold value N. If yes, the counter is reset in step 1034 and processing returns to step 200. If not, processing proceeds to step 1050, wherein the value stored in memory is retrieved, if available. Steps 1032 and 1034 place a limit on the number of images which may be used to determine lens flare. This prevents the method from repeating indefinitely, inevitably resulting, eventually, in detection of flare. If flare has not been detected for the first time in the cycle, processing proceeds to decision block 1010.

In decision block 1010, it is determined whether the determined probability is less than or equal to a threshold value Z. If the determined probability is less than or equal to Z, the user is warned in step 1020. If not, the probability is stored in memory and processing returns to step 200.

If a value is retrieved, in step 1060, the retrieved value may be combined with the determined probability This combination may be, for example, a product, average, weighted average or other statistical combination. Alternatively, if no value is stored in memory, the probability determined in step 1000 is used. Processing then proceeds to decision block 1070 wherein the image processing unit 20 determines whether the combined value is less than or equal to Z. If yes, the user is warned in step 1020. If not, in step 1080, the value stored in memory is replaced with the combined value and processing returns to step 200 wherein the image processing unit 20 continues attempting to detect flare.

By way an example, if, at step 1000, the probability for the first image is determined to be 0.25, the probability for the second image is determined to be 0.25 and the probability for the third image is determined to be 0.25, the value stored in memory in step 1080 may be the product of these values, 0.015625. Thus, if for each image there is a relatively high probability that what is detected is flare, the value stored in memory will approach zero relatively quickly. If the probability for the fourth image is also determined to be 0.25 and if, for example, Z were set equal to 0.01, the probability determined at step 1000 would be less than or equal to Z at step 1010 and the user would promptly be warned, with a high degree of accuracy, to clean his or her lens at step 1020. Because the value stored in memory approaches zero relatively quickly when there is a high probability that what is detected is flare, N may be desirably set to a relatively low number (e.g., 4 or 5).

While the above example is described with respect to combining probabilities, other statistical methods known in the art may also be used. By way of example, a weighted average may be used, where older probabilities are given less weight than newer probabilities.

In another embodiment, motion detection may be used to distinguish between whether what is detected is flare or blur caused by, for example, movement of the camera. If a predetermined amount of motion is detected, it is more likely that what is detected is blur caused by movement of the camera. Therefore, motion detection may be added to any of the processes described with respect to FIGS. 2 and 7-9. In these methods, if, after flare is detected in step 210, the counter value equals X in step 806 or the result is less than or equal to Z in step 1070, the predetermined amount of motion is detected, then the process is interrupted and processing automatically returns to step 200 wherein the image processing unit 20 continues attempting to detect flare.

Motion may be detected, for example, using a mechanical motion detector 3 (e.g., a gyroscope, a MEMS gyroscope, an accelerometer or a MEMS accelerometer). This may be a particularly useful alternative if such motion detection is implemented in a camera/camera phone that already includes a mechanical motion detector for use in another function. Alternatively, motion may be detected by comparing consecutive images. This may be a particularly useful alternative if motion detection is implemented in a camera/camera phone that also captures videos. Here, if a video is being captured and the captured video is compressed using MPEG compression, the image processing unit 20 may obtain motion vectors from the MPEG compression. Thus, very little additional processing may be required to implement motion detection for such a camera/camera phone.

There are many different ways in which the image processing unit 20 may cause a warning to be issued. As shown in FIG. 1, and described briefly above, the image processing unit 20 may issue a control signal to one or more of the lighting unit 30, the display 40, the speaker 50 and the vibration motor 60.

Figure 11A:
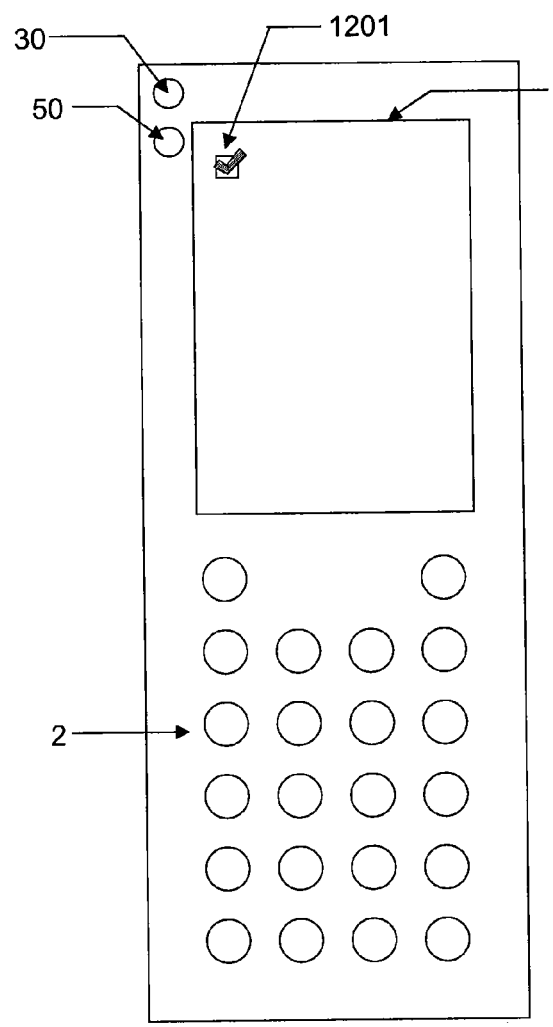
FIGS. 11A and 11B are front views of an example cellular phone camera configured to display different example indications that a lens is contaminated.
Figure 11B:
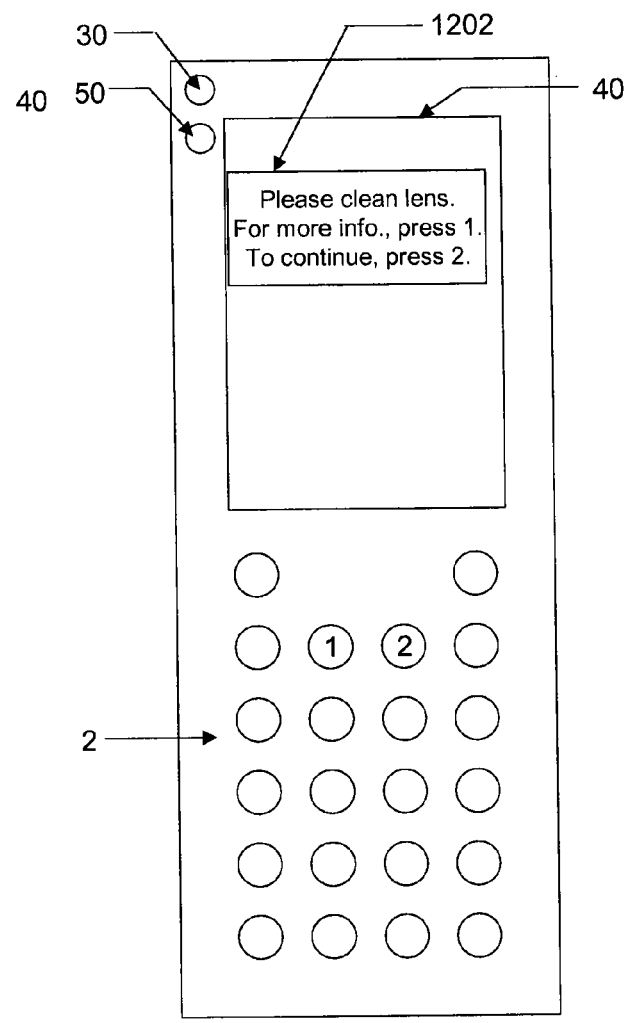

FIGS. 11A and 11B show front views of example camera phones implementing any of the lens cleaning warning systems and methods described above. As shown, the example cameras include the lighting unit 30, the speaker 50, the display 40 and the input unit 2. The embodiment shown in FIG. 11A uses a graphic 1201 as an indication to warn the user to clean the lens. While a specific graphic is shown in FIG. 11A, any graphic may be used for this purpose. The embodiment shown in FIG. 11B uses text 1202 as the indication. Again, while specific text is shown in FIG. 11B, any suitable text may be used for this purpose. As shown in FIG. 11B, the user may be given the option to automatically discontinue display of the indication (e.g., by pressing 2). The user may also be given the option to obtain more information on what the indication means (e.g., by pressing 1). The indication may be provided either before or after the user takes a picture. If it is provided after the user takes the picture, the user may be given the option to either save the picture or to clean the lens and re-take the picture without saving (not shown).

The lighting unit 30 may be, for example, an LED that emits light responsive to receipt of the control signal. The emitted light may be continuous or varying. If an auditory warning is issued, the speaker 50 may output a sound, a series of sounds or a verbal warning notifying the user to clean his or her lens. Alternatively, if the warning system is included in a camera phone, a vibratory warning may be issued by vibrating the vibration motor 60 of the phone to alert the user to clean his or her lens.

While in the embodiment shown in FIG. 1, and in all the embodiments described above, the warning system uses the image processing unit 20 to carry out the flare detecting and control functions, a separate processing/control unit may be used to carry out these functions. Accordingly, the warning system may be entirely provided on the same chip as the pixel array 10, the image processing unit 20 and the memory 70 or may be provided in a separate chip (not shown).

Figure 10:
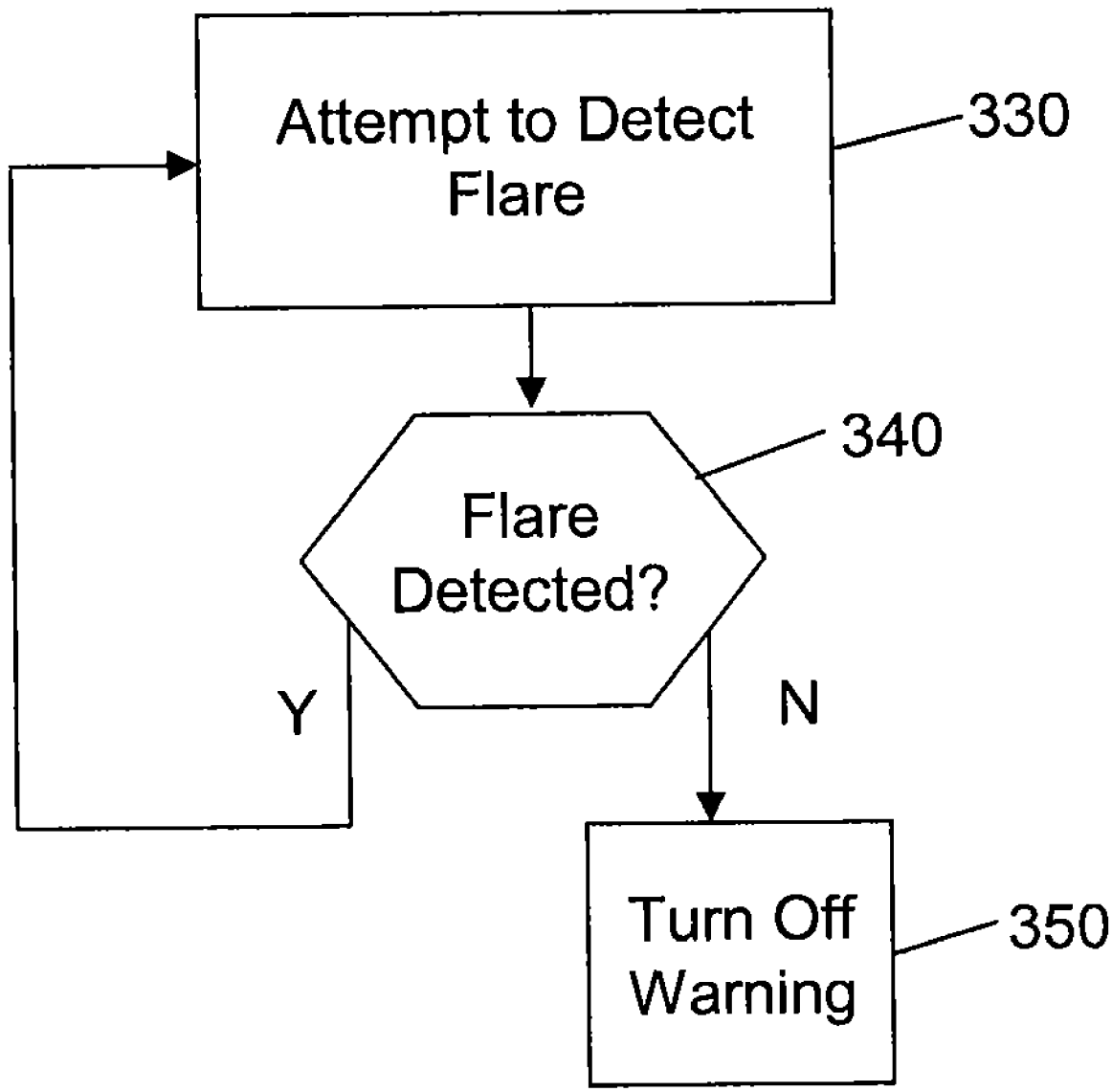
FIG. 10 is a flow chart of steps for determining when to discontinue a provided indication.

Once a warning is issued, the warning may be disabled in one of a number of different ways. FIG. 10 is a flow chart showing example steps for turning off the warning according to one embodiment. In this embodiment, after a warning has been issued, processing continues at step 330 wherein the image processing unit 20 attempts to detect lens flare. In step 340, whether the image processing unit 20 detected lens flare is determined. If the image processing unit 20 detected lens flare, processing returns to step 330 wherein the image processing unit 20 continues attempting to detect lens flare. If the image processing unit 20 did not detect lens flare, processing continues at step 350 wherein the warning is discontinued. By way of example, to turn off the warning, the image processing unit 20 may provide a control signal to the one or more of the lighting unit 30, the display 40, the speaker 50 and/or the vibration motor 60.

In another embodiment, a user may simply turn off the warning system to disable the indication using, for example, input unit 2. This embodiment may be used in conjunction with the embodiment shown in FIG. 10 such that the warning system may be turned off either manually or automatically when flare is no longer detected. Alternatively, this embodiment may be used alone such that a user must turn off the system to disable the warning.

The processes used to determine when to turn off the warning need not be as accurate as the processes used to determine when to turn on the warning. It may even be desirable, in some instances, to turn off the warning with less accuracy in order to ensure that the warning does not distractingly stay on for a long period of time after the user has already cleaned the lens. In one embodiment, this may be done by not using probabilities (see FIG. 9) or scene changes (see FIG. 8A) to determine when to turn off the warning. Further, this may be done by processing a smaller number of images or only one image (see FIGS. 7 and 8A) when determining when to turn off the warning. In another embodiment, once the warning is turned off either manually or automatically, the image processing unit 20 may check the auto exposure for scene stabilization. In this embodiment, the image processing unit 20 may be configured so that it does not attempt to detect flare until the scene stabilizes. This may prevent a false detection of flare due to blur which may otherwise cause the warning to be falsely issued immediately after the warning is turned off. This may be particularly desirable where the user has just cleaned his or her lens.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A lens cleaning warning system for a camera which receives light representing a scene, the system comprising:
    a pixel array which provides image data from the light received by the camera;
    a lens unit which focuses the received light onto the pixel array; and
    an image processing unit which analyzes the image data corresponding to a single image to determine whether the image data corresponding to the single image indicates defects attributable to the lens being contaminated and, if so, provides an indication that the lens is contaminated, wherein the image processing unit is configured to:
    generate a histogram of the image data corresponding to the single image; and
    analyze the histogram for an absence of the image data within a first predetermined range of values, for a presence of the image data within a second predetermined range of values and for a presence of image data within a third predetermined range of values, not adjacent to the first or second predetermined ranges, to provide the indication that the lens is contaminated.

2. The system of claim 1, wherein the at least one lens cleaning warning unit is selected from the group consisting of a lighting unit, a display, a speaker and a vibration motor.

3. The system of claim 1, wherein the indication is a graphic displayed on a display.

4. The system of claim 1, wherein the indication is text displayed on a display.

5. The system of claim 1, further comprising an input unit which provides notification to the image processing unit to disable the indication responsive to receipt of the notification.

6. The system of claim 1, wherein the image processing unit continues analyzing the image data after the indication is provided to determine whether the image data again indicates defects attributable to the lens being contaminated and, if not, controls the at least one lens cleaning warning unit to discontinue providing the indication.

7. The system of claim 1, wherein the pixel array and the image processing unit are provided on a single chip.

8. The system of claim 1, wherein the pixel array and the image processing unit are provided on separate chips.

9. A method of warning that a lens of a camera is contaminated comprising:
    receiving light into the camera;
    generating image data from the received light;
    analyzing the image data corresponding to a single image for luminance values within first, second and third predetermined ranges; and
    if image data values within the first predetermined range are not found and image data values within the second and third predetermined ranges are found, providing an indication that the lens is contaminated, where the third predetermined range of values is not adjacent to the first or second predetermined ranges of values.

10. The method of claim 9, wherein the first predetermined range is a range of luminance values corresponding to black image picture elements (pixels) and the second predetermined range is a range of luminance values adjacent to the first range in the histogram.

11. The method of claim 9, further comprising:
    determining a black level of the camera;
    selecting values for the first predetermined range based at least on the determined black level and
    selecting values for the second predetermined range based on the first predetermined range such that there are no values of the histogram between the first and second predetermined ranges.

12. The method of claim 9, wherein the image data is a histogram of luminance values corresponding to the single image, and the step of analyzing the image data includes analyzing the histogram for luminance values within the first and second predetermined ranges.

13. The method of claim 12, wherein the first predetermined range is approximately 5 percent of a range of values represented by the at least one histogram.

14. The method of claim 12, wherein the first predetermined range is camera-specific.

15. A method of warning that a lens of a camera is contaminated comprising:
    focusing a scene within view of a lens unit onto a pixel array;
    capturing the scene as a single image of image data using the pixel array;
    analyzing the image data to detect whether the single image contains defects attributable to the lens being contaminated, including:
    generating a histogram of the image data of the single image; and
    analyzing the histogram for an absence of the image data within a first predetermined range of values and for a presence of the image data within a second predetermined range of values and a third predetermined range of values not adjacent to the first or second predetermined ranges of values to detect the defects attributable to the lens being contaminated;
    repeating the focusing, capturing and analyzing steps for at least one other image; and
    providing an indication that the lens is contaminated if defects attributable to the lens being contaminated are detected with respect to at least one of the captured images.

16. The method of claim 15, wherein the step of providing the indication includes providing the indication if it is determined that a predetermined number of consecutively captured images indicate defects attributable to the lens being contaminated.

* * * * *